United States Patent [19]
Jung

[11] 3,936,024
[45] Feb. 3, 1976

[54] SUPPORTING-FRAME STRUCTURES

[75] Inventor: Otto Jung, Obergoesgen, Switzerland

[73] Assignee: H. Heer & Co., Olten, Switzerland

[22] Filed: June 19, 1974

[21] Appl. No.: 480,858

[30] Foreign Application Priority Data
June 20, 1973 Switzerland.......................... 8939/73
Jan. 28, 1974 Switzerland.......................... 1098/74

[52] U.S. Cl. .................. 248/243; 211/176; 248/49
[51] Int. Cl.² ............................................ A47F 5/10
[58] Field of Search.................... 211/148, 176, 177; 248/243, 49; 108/107, 108, 144

[56] References Cited
UNITED STATES PATENTS
| | | | |
|---|---|---|---|
| 3,195,735 | 7/1965 | Jay.................................. | 248/243 X |
| 3,575,299 | 4/1971 | O'Dette.......................... | 248/243 X |

FOREIGN PATENTS OR APPLICATIONS
| | | | |
|---|---|---|---|
| 1,547,647 | 10/1968 | France............................... | 248/243 |
| 624,707 | 11/1962 | Belgium............................. | 248/243 |
| 661,902 | 4/1964 | Italy.................................... | 248/243 |
| 102 | 1906 | United Kingdom................. | 248/243 |
| 1,198,887 | 7/1970 | United Kingdom................. | 248/243 |

Primary Examiner—Roy D. Frazier
Assistant Examiner—Terrell P. Lewis
Attorney, Agent, or Firm—Donald D. Denton

[57] ABSTRACT

A carrying structure for supporting, for example, cable ducts, comprises vertical bearers from which project disengagable, horizontal bearer arms. Each bearer arm has at least two hooks adjacent one end thereof, which hooks, when inserted into corresponding holes of a vertical row of holes formed in a vertical bearer, engage the bearer arm with the vertical bearer. The hooks of an arm are integral therewith and project laterally of the arm surface which is in face to face relation with the hole-defining surface of the vertical bearer when the arm is engaged with the bearer. Each hook has on one of its side edges a lateral support surface above the vertical portion of the hook which engages the vertical bearer on its side opposite to the main body of the bearer arm. This support surface engages a vertical side of the hole in which the hook is inserted enabling the transmission between the bearer arm and vertical bearer of horizontal moments.

8 Claims, 6 Drawing Figures

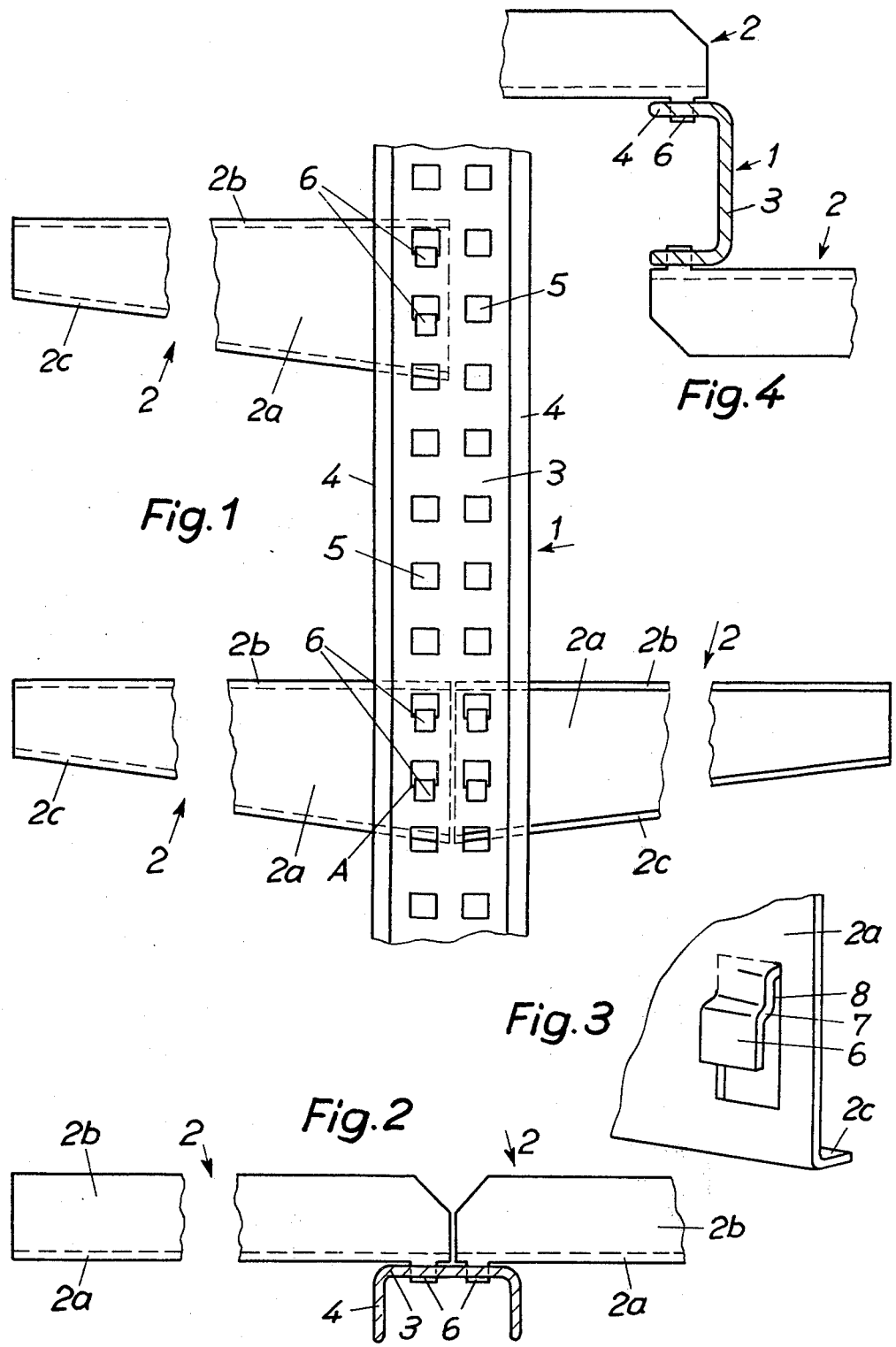

SUPPORTING-FRAME STRUCTURES

BACKGROUND OF THE INVENTION

1. Field of the Invention

The invention relates to a carrying structure, in particular for cable ducts, comprising vertical bearers and horizontal bearer arms suspensible from the former at optional height in holes, at least one of the vertically extending surfaces of the vertical bearer comprising at least one vertical row of holes. The bearer arms serve the purpose of securing cable ducts.

2. Description of the Prior Art

In known carrying structures of this nature, the vertical bearers consist of rolled sections which are either T-section such that bearer arms may be fastened in a row of holes at selectible height on the central web by means of a plug-in bolt extending in each case through the bearer arm and through a hole, the bearer arm carrying load on its free extremity being supported on the transverse branch of the T-section, or which rolled sections may on the other hand also be of cruciform cross-section so that bearer arms may in accordance with the aforesaid structure be installed at two sides of a vertical bearer, the vertical bearers concomitantly and in any event being fastened to the ceiling or between the floor and the ceiling and act as a framework if it is impossible to make use of a wall-mounting method for bearer arms. The trough-like cable ducts which serve the purpose of laying cables running parallel to each other, are supported on the bearer arms.

The sections referred to above for the vertical bearer should be machined precisely so that the bearer arms may be installed, being relatively costly for this reason and having a considerable weight, moreover, which complicates assembling jobs. The object of the present invention consists in devising an advantageously costed carrying device, in particular for cable ducts, for which a lesser amount of material should be needed, so that they are lighter, and which imply a lesser degree of complexity in respect of their production as well as of their installation.

SUMMARY OF THE INVENTION

To accomplish this purpose, the carrying device comprises vertical bearers and horizontal bearer arms suspendible from the former in holes at selectible height, at least one of the vertically extending surfaces of the vertical bearer having at least one vertical row of holes, and is characterised in accordance with the invention, in that each bearer arm comprises at least two hooks intended to engage behind the vertical bearer in the area of the holes, which are situated close to the one extremity, project from its surface which is intended to be placed in contact with the perforated surface of the vertical bearer, and are spaced apart by a distance corresponding to the distance between the holes or to a multiple of the same, that the bearer arm and the hooks are in one piece, and that each hook has a lateral support surface intended to be placed in contact with a vertical hole surface in the vertical bearer for the purpose of transmitting the moment forces acting in horizontal direction on the bearer arm, and which lateral support surface is situated on one of the two lateral edges of the hook and above the hook portion intended to engage behind the vertical bearer. Preferably the bearer arm and the hook are appropriately constructed in such manner that each hook has two lateral edges of different length and at the side of the longer edge has a first shoulder slantingly pressed out of the bearer arm and comprising the support surface, which is followed as a second shoulder by the hook portion which projects further from the bearer arm and is intended to engage behind the vertical bearer. Moreover, the bearer arm is appropriately so formed that two hooks arranged one above the other with vertical spacing on the bearer arm have a support surface on their edges situated at opposite sides, in order to bear the moment forces acting in horizontal direction.

The vertical bearer preferably consists of a bearer of U-section in cross-section, whereof the middle web has at least one vertical row of holes. It is also possible to endow each of the two branches of the U-section bearer with a row of holes or to incorporate both possibilities together in an U-section bearer. The holes of the row of holes are appropriately rectangular or square.

A special advantage of the U-section bearer consists in that, except for the one or more rows of holes, there is no need to adhere to precise production tolerances, as had been required in the case of the sections used for this purpose until now. In the case of the rows of holes incorporated in the branches of the U-section bearer, it is possible moreover for the bearer arms overhanging at one side as well as at the other to be of identical structure, whereas these would have to be of inverted structure if they are hooked into the middle web of the U-section bearer.

The vertical bearer may advantageously also have a Z-section, whereof the application renders it possible for bearer arms overhanging at both sides to be of identical structure and to be suspensible at the same height from the vertical bearer.

BRIEF DESCRIPTION OF THE DRAWINGS

Examples of embodiments of the invention are described in particular in the following, with reference to the drawings. In these:

FIG. 1, shows the carrying device in elevation with a partially illustrated vertical bearer in the form of an U-section and with bearer arms hooked into the middle web of the same;

FIG. 2, shows the carrying device according to FIG. 1 in plan view;

FIG. 3, shows a detail A of FIG. 1 to enlarged scale, showing a part of the bearer arm with the lower hook;

FIG. 4, shows a modified embodiment of the carrying device, seen from above as in FIG. 2, with bearer arms hooked into the branches of the U-section;

DESCRIPTION OF THE PREFERRED EMBODIMENTS

Figure 5:
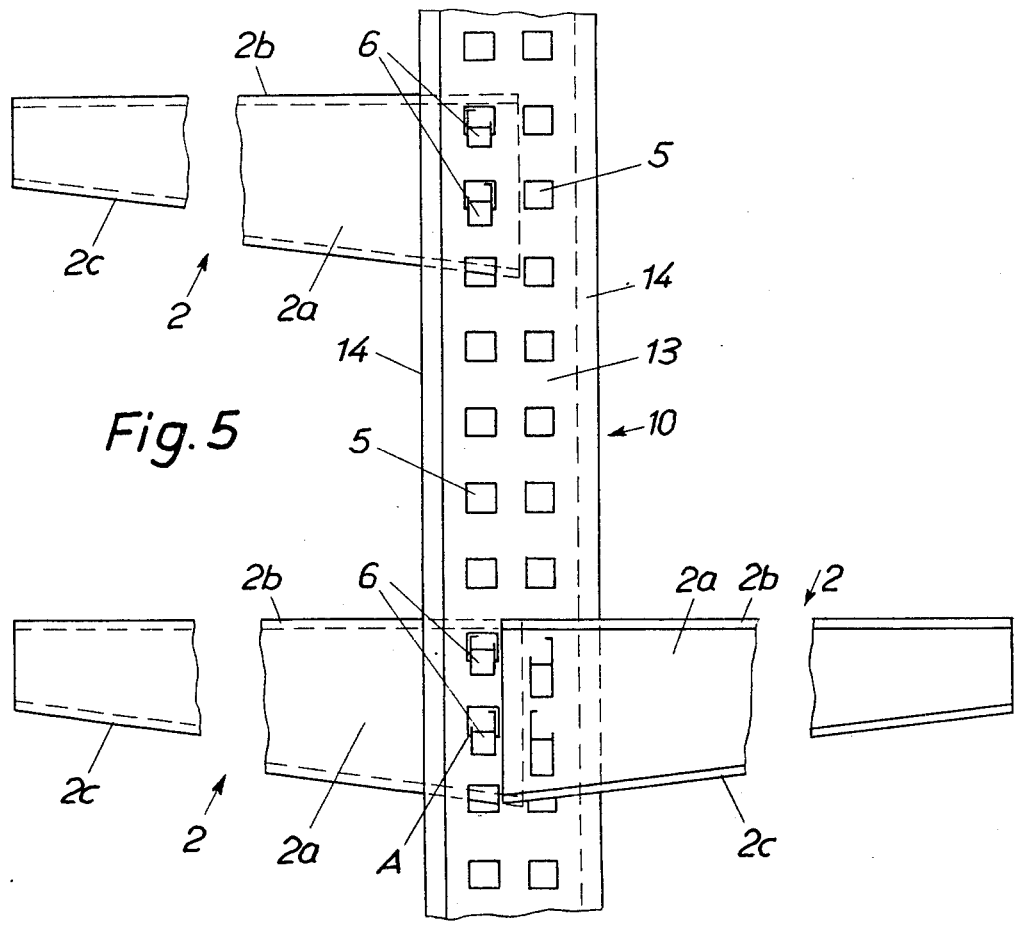
FIG. 5, shows another form of embodiment of the carrying device comprising a vertical bearer in the form of a Z-section.

The carrying device according to FIGS. 1 to 3 comprises a vertical bearer or vertical bearer member 1, with a number of said bearers being fastened to the ceiling or between the floor and ceiling of a room in manner not shown in detail, and moreover bearer arms 2 secured on the vertical bearer, which may be hooked into the latter so that they project outwards from the one side or from both sides of the vertical bearer. The cable ducts consisting of perforated sheets of metal shaped in trough form, which may be of different width and serve the purpose of laying the cables, are fastened on these bearer arms.

The vertical bearer 1 has an U-section with a middle web 3 and two lateral branches or branch portions 4. Two vertical rows of holes comprising rectangular or square holes or holes having rectangular and square configurations 5, are incorporated in the middle web 3, said rows of holes extending throughout the height of the vertical bearer.

Each bearer arm 2 is constructed in U form in cross-section, and the vertically directed middle web of this U-shaped bearer arm forms the surface 2a bearing against the middle web 3 of the U-shaped vertical bearer. The upper branch 2b of the U-shaped bearer arm 2 is wider than the lower branch 2c of the bearer arm, and serves the purpose of supporting and fastening the cable ducts which are illustrated, extend at right angles to the direction of the bearer arms and are supported on several bearer arms which are secured on a vertical bearer in each case. From the middle web 2a of the U-shaped bearer arm 2, which is in contact against the middle web 3 of the vertical bearer 1, two wall portions 6 close to the one bearer arm extremity are excised on three sides by punching cuts in each case, and are bent over into a hook 6, the vertical spacing between these hooks being equal to the vertical spacing between the holes 5 in the vertical bearer 1.

The detail A of FIG. 1, consisting of a bearer arm portion and the lower hook, is illustrated in perspective to enlarged scale in FIG. 3. The hook portion intended to engage behind the vertical bearer, which is excised by cuts from the wall 2a of the bearer arm, extends at a distance from and parallel to the wall 2a, which distance corresponds approximately to the wall thickness of the middle web of the vertical bearer 1. It is clear that, in the case of a hook delimited by cut edges of identical length at both sides, a small area 7 only of the hook edge would be available which could be braced against the hole side of a hole 5 in the vertical bearer in order to transmit the horizontal forces. So that the considerable forces may be transmitted more adequately, each hook is delimited as apparent from FIG. 3 by two lateral edges of different length, whereof the longer edge is bent over twice, so that apart from the edge portion 7 already referred to, the hook also bears against the vertical hole side of a hole in the vertical bearer with a support surface 8 present on a first shoulder which is slantingly pressed out of the bearer arm. Accordingly, and in accordance with FIG. 3, the first shoulder of the hook is pressed out of the bearer arm wall 2a only at the right-hand side, that is to say approximately to the extent of one wall thickness of the bearer arm. In FIG. 1, the hooks 6 are visible on the bearer arms which are hooked in from the rear side of the vertical bearer in the drawing.

It is shown in FIG. 4 that two bearer arms of indentical structure may also be hooked into an U-section bearer whilst projecting towards both sides, if at least one row of holes is incorporated in each of the two branches of the U-section. Identical bearer arms simplify the job of erection and render it possible to reduce investments in stock.

The vertical bearer 10 according to FIG. 5 has a Z-section, comprising a middle web 13 and two lateral swagedover flanges 14. Two vertical rows of holes comprising rectangular or square holes 5 are incorporated in the middle web 13, said holes corresponding to the holes in the bearer according to FIG. 1, which rows of holes extend throughout the height of the vertical bearer.

Figure 6:
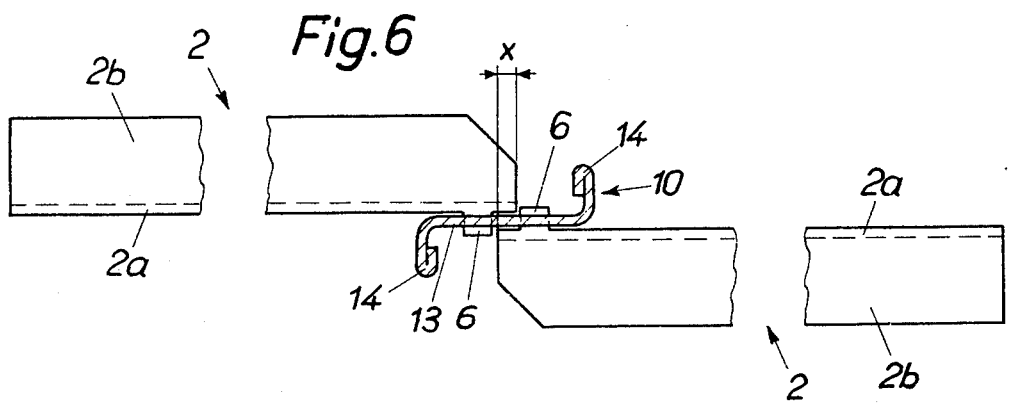
FIG. 6, shows the carrying device according to FIG. 5, in plan view.

The bearer arms 2 which are to be hooked into the vertical bearer 10 have the same form as the previously described bearer arms for the vertical bearer 1 having an U-section. If use is made of the Z-section vertical bearer, the hooks 6 should be situated on the bearer arm 2 in such manner that the distance of the hooks 6 from the extremity of the bearer arm should be not greater than or equal to the distance between the two hole sides of the holes 5 in the two rows of holes which are internally situated with respect to the axis of longitudinal symmetry of the vertical bearer, so that two bearer arms hooked in at the same level from the front side and from the rear side of the vertical bearer overlap each other in the area between the two rows of holes, said area being marked X in FIG. 6. In this arrangement, each bearer arm extremity is adjacently situated beside the hooks of the other corresponding bearer arm, so also apparent from FIG. 6.

The advantage of the Z-section for the vertical bearer emerges during comparison with the U-section, the latter allowing the bearer arms to be hooked in at the one side only of the bearer in view of the two branches of the U-section, and the rows of holes must also be set at a greater distance from each other so that two bearer arms maybe positioned at the same level. Accordingly, the Z-section renders it possible to keep the vertical bearer narrower as a whole and has the advantage moreover that the bearer arms alternately hooked in from the front side and from the rear side may all be identically constructed, whereas they must be made in laterally inverted form if use is made of an U-section, in order to be hooked into its middle web (FIG. 2).

The hooks 6 are visible in FIG. 5 on the bearer arms projecting towards the left-hand side, which are hooked in from the rear side of the vertical bearer, whereas only the wall excisions are visible in the bearer arm, in the case of the bearer arm projecting towards the right-hand side.

Apart from cable ducts, the carrying device may also be applied advantageously as a storage rack, for example for tube and bar stock. Its advantage is economic production and an assembling operation which may be performed very easily and rapidly.

What we claim is:

1. Carrying device for supporting cable ducts and the like comprising: a vertical bearer member and horizontal bearer arms suspensible from the vertical bearer member at selectible height, said bearer member having at least one vertical row of spaced holes, each of said holes having a vertical side, characterized in that each bearer arm has two spaced hooks one above the other adjacent to one horizontal extremity of said arm, said hooks projecting from the bearer arm and adapted to pass through mating spaced holes in said vertical bearer member so that each of said hooks engages the vertical bearer member in the area of the hole, each of said hooks having two lateral edges of different length, the side of the longer edge having a first shoulder pressed out slantingly from the bearer arm in the form of a support surface adapted to abut against the vertical side of the hole, which first shoulder is followed by a second shoulder consisting of a hooking portion projecting farther from the bearer arm for engagement behind the vertical bearer member with said support surfaces positioned on opposite sides of said hooks, whereby the moment forces acting on the bearer arm are transmittable in a horizontal direction.

2. Carrying device according to claim 1 in which the vertical bearer member has a U-shaped cross-section wherein the middle web thereof has at least one vertical row of holes.

3. Carrying device according to claim 2 in which the bearer arms are of inverted identical construction and may be hooked into the middle web of the U-shaped vertical bearer member while projecting towards the one and/or the other side.

4. Carrying device according to claim 1 in which the vertical bearer member has a U-shaped cross-section with each of the branch portions extending from the middle web and having a vertical row of holes.

5. Carrying device according to claim 1 in which the vertical bearer member has a U-shaped cross-section with the middle web and each of the branch portions having a vertical row of holes.

6. Carrying device according to claim 1 in which the holes defined by said rows of holes are rectangular in configuration.

7. Carrying device according to claim 1 in which the vertical bearer member has a Z-shaped cross-section and its middle web has at least two rows of holes extending vertically and parallel to each other, into which bearer arms may be hooked into one row of holes from one side of the middle web and bearer arms may be hooked into the other side thereof while projecting outwards at the same leverl towards opposite sides from the vertical bearer member.

8. Carrying device according to claim 1 in which the bearer arms are identically constructed and may, while projecting outwards towards the one and/or the other side, be hooked into the middle web of a Z-shaped cross-sectional vertical bearer member or into the branches of a U-shaped cross-sectional bearer member.

* * * * *